United States Patent [19]
Mortimer et al.

[11] Patent Number: 6,114,428
[45] Date of Patent: Sep. 5, 2000

[54] COMPOSITIONS OF THERMOPLASTIC POLYMER AND SMELT

[75] Inventors: Jacques Mortimer, Markham; Ladislau A. Tivadar, North York, both of Canada

[73] Assignee: Mortile Industries Ltd., Scarborough, Canada

[21] Appl. No.: 09/047,680

[22] Filed: Mar. 25, 1998

[30] Foreign Application Priority Data

Mar. 27, 1997 [CA] Canada ................................ 2201199

[51] Int. Cl.⁷ ........................................................ C08K 3/26
[52] U.S. Cl. ........................... 524/427; 524/420; 524/423
[58] Field of Search ..................................... 524/420, 423, 524/427

[56] References Cited

FOREIGN PATENT DOCUMENTS 3019225  11/1981  Germany.
19528938  2/1997  Germany.

*Primary Examiner*—Helen L. Pezzuto
*Attorney, Agent, or Firm*—Ohlandt, Greeley, Ruggiero & Perle, L.L.P.

[57] ABSTRACT

A composition of smelt and a thermoplastic polymer, and uses, are disclosed. Smelt is a by-product of the pulp and paper industry.

20 Claims, No Drawings

1

COMPOSITIONS OF THERMOPLASTIC POLYMER AND SMELT

The present invention relates to polymer compositions, and in particular to compositions of thermoplastic polymer with a by-product of a pulp and paper mill that is known in the trade as smelt. Smelt may also be referred to in the trade as "top ash", "precipitator ash" or "recovery boiler residues", all of which are referred to herein as smelt.

One of the by-products of a pulp and paper mill is a mixture of inorganic chemicals that are primarily salts of sodium. The by-product is known as smelt, as discussed above, and is regarded as an environmentally hazardous mixture of inorganic chemicals. Typical examples of such chemicals are sodium carbonate, sodium sulphide, sodium sulphate and sodium chloride. Salts of potassium and/or magnesium may also be present The by-product i.e. smelt, is typically disposed of in a landfill and environmentally more acceptable methods of disposal of smelt would be worthwhile.

In an landfill, or in other locations, smelt will come in contact with moisture. Such moisture results in chemical reactions, such as the alkaline hydrolysis of the sodium and potassium carbonate and sodium sulphide. The latter is frequently accompanied by the generation of gaseous hydrogen sulphide.

Chemical substances that are alkaline in nature, when mixed into at least some polymers, tend to adversely affect the physical properties of the polymer. In particular, depending on the type of polymer, alkaline substances have a tendency to cause degradation of the polymer.

Polymer compositions of plastics with smelt as a filler, a foaming agent, or a stabilizer, or other component, have now been found, and such compositions have useful properties.

Accordingly, the present invention provides a composition of polymer and smelt, especially a composition of thermoplastic polymer and smelt.

In preferred embodiments of the composition of the present invention, the smelt acts as a filler, a foaming agent and/or as a stabilizer for the polymer.

In another embodiment, the polymer is a thermoplastic polymer.

In further embodiments of the invention, the polymer is selected from polyolefin, polyamide, polyurethane, polyester, polycarbonate, acrylic polymers and elastomers.

In a still further embodiment, the composition additionally contains a mono- or polyfunctional organic acid.

The present invention relates to the use of smelt in polymer compositions. As used herein, "smelt" refers to an incinerated pulping and bleaching liquor from the pulp and paper industry, that has been concentrated by thermal evaporation followed by recovery boiler combustion. In particular, the liquor is from so-called Chemi-Thermo-Mechanical Pulp (CTMP) and peroxide bleaching. The smelt collected as solid plaques at the bottom of the recovery boiler tends to be grey/pink in colour when dry and grey/blue in colour in the presence of water. For use in plastics, the solid plaques must be ground to a suitable mesh size. The precipitator ash, or top ash, collected at the top of the boiler is a very fine, white color powder, generally having a particle size less than 100 mesh.

In examples of smelt, the composition may be as follows: sodium carbonate 30–99% by weight, potassium carbonate 0.01–10% by weight, sodium sulphate 0.5–30%, sodium sulphide 0.01–20% by weight, sodium chloride 0–5% by weight and water-insoluble chemicals, including silicates, oxides or organic material 0–40% by weight, with the balance typically being other chemicals, including magnesium compounds. However, it will be understood that the composition of smelt from a particular pulp and paper mill will vary and further variations may be expected from one mill to another, especially where the mills are operated by different companies or utilize different procedures.

The polymer of the polymer composition is a thermoplastic polymer. Examples of such polymers include polymers or copolymers of olefin monomers including ethylene, propylene, vinyl chloride, styrene, butylene, isobutylene, and vinyl acetate. Other polyolefins may be used. In addition, the thermoplastic polymer may be a copolymer of acrylic monomers such as acrylic acid, and ionomers thereof, including sodium acrylate and acrylic esters e.g. methyl and ethyl acrylate, methyl or ethyl methacrylate, and ethylene/acrylic acid (EAA) copolymers. Copolymers of acrylic monomers with olefines and vinyl monomers are also included, e.g. ethylene-acrylic acid copolymer, ethylene-methyl acrylate copolymer, acrylonitrile-butadiene-styrene polymers. Elastomeric copolymers or terpolymers of olefines may be used, such as ethylene-propylene elastomer, ethylene-propylene-diene (e.g. butadiene) elastomer e.g. EPDM polymers. In addition the thermoplastic polymer may be a polycondensation product such as polyamides, polyurethanes, polyesters and polycarbonates. Examples of polyurethanes are condensation products of polyisocyanates and a hydroxyl-containing material, including polymers of hexamethylene disocyanate and 1,4-butanediol. Examples of polyamides are polymers of lactams and amino carboxylic acids and polymers of dicarboxylic acids and diamines, including nylon 6, nylon 11, nylon 12, nylon 6,6, nylon 6,10, nylon 12,12 and the like. Examples of polyesters are polymers of dicarboxylic acids and dihydroxy compounds including polyethylene terephthalate and polybutylene terephthalate. The polymer composition may contain one polymer or a mixture of two or more polymers as the final application requires. The polymers are of a molecular weight that is typical of polymers that are used in melt processing apparatus.

The amount of smelt that may be incorporated into the polymer may be varied over a wide range. For instance, the amount of smelt may be up 90% by weight of the polymer. The upper limit on the amount of smelt in the polymer is primarily governed by the ability to incorporate the smelt into the polymer in melt processing apparatus. For example, the amount of smelt may be in the range of 1–90% by weight, and in preferred embodiments is in the range of 10–75% by weight and especially in the range of 25–60% by weight.

Other additives may be incorporated into the polymer in addition to the smelt. For instance, the polymer may contain up to about 50%, preferably up to 36% and especially up to about 25% by weight of other additives such as organic acids as well as plastifiers, stabilisers, pigments, and fillers or colorants. The organic acids may be mono or polyfunctional organic acids having one, two or three carboxylic acid functional groups. Examples of such organic acids include oxalic acid, tartaric acid, citric acid, malic acid, maleic acid, malonic acid and succinic acid. When the smelt is used for foaming, acid has to be added to the composition. This amount of acid depends on the type of the acid and can be up to 50% by weight.

As noted above, smelt is a by-product of the pulp and paper industry, and is regarded as being primarily a mixture of inorganic chemicals. Typical chemicals found in smelt include sodium carbonate, potassium carbonate, sodium sulphate, sodium sulphide, sodium chloride as well as other water-insoluble chemicals eg. silicates and oxides. Smelt may also includes organic carbon compounds.

Due to its particular chemical composition, the smelt powder is believed to be useful as a filler without having any inconvenience generated by the alkaline character of it. Moreover, the presence of the sulfide anion provides a stabilizing effect to many polymers, in the same manner as different hydrides do. In addition, the carbonate content of the smelt mixed together in plastics with a solid organic acid acts as a foaming agent by generating carbon dioxide during thermal processing.

In an embodiment of the invention, the composition of smelt is as follows: sodium carbonate 63–91% by weight, potassium carbonate 1–5% by weight, sodium sulphate 4–10% by weight, sodium sulphide 0.01–12% by weight, sodium chloride 0.09–2% by weight and water insoluble chemicals 3.9–8% by weight. In another embodiment, smelt has a composition of sodium carbonate 41–99% by weight, potassium carbonate 0.01–3% by weight, sodium sulphate 0.98–20% by weight, sodium sulphide 0.01–14% by weight, sodium chloride 0–2% by weight and water insoluble chemicals 0–20% by weight. An approximate composition of another example of smelt is, by weight, sodium carbonate 75–85%, sodium sulphate 4–8%, sodium sulphide 8–12%, sodium chloride 0.5–2 and water-insoluble matter 5–10%. Any remaining amounts are typically other chemicals.

Smelt may have a wide range of particle size e.g. in the range of 0.0005 mm to 1.00 mm, preferably in the range of 0.001–0.01 mm.

Smelt may be incorporated into the thermoplastic polymer by techniques known in the art for incorporating filler or other materials into thermoplastic polymers. In particular, the thermoplastic polymer and the smelt may be fed to an extruder that is operated at temperatures above the melting point of the thermoplastic polymer. The smelt is compounded into the polymer using such equipment. Alternatively, smelt may be compounded into the thermoplastic polymer so as to form a concentrate of the smelt within the polymer. The concentrate may then be fed to further processing equipment, blended with additional polymer and extruded in order to fabricate an article. Premixing operations may also be used e.g. using internal mixing apparatus, examples of which are Banbury and Moriyama mixers. So-called salt and pepper blends may be used. It is understood that the thermoplastic polymer used to form such a concentrate need not be the same thermoplastic polymer as used to form the article, although the two thermoplastic polymers should be compatible. Compatibilizers may be used, if necessary.

In another embodiment, the smelt may be compounded into the thermoplastic polymer and fabricated directly into an article without forming a concentrate or forming a compounded composition of polymer and concentrate which is subsequently fabricated into an article.

Compositions of smelt and thermoplastic polymer may be fabricated into articles in a wide variety of melt processing equipment used for the processing of thermoplastic polymers. Such equipment includes extruders, compounding equipment, moulding equipment, sheet forming equipment and film blowing equipment.

The smelt may be used as a filler for the thermoplastic polymer. Alternatively, the smelt may be used as a foaming agent for the thermoplastic polymer. In the latter embodiment, acidic components may be blended with the smelt in order to generate gas for the foaming of the polymer. Typical acidic components have been described above.

Articles from the compositions of polymers and smelt may be used as, for example, plastic wood e.g. plastic lumber, skids, matting, bumpers, live stock flooring, garbage bags, fencing parts, in marine applications e.g. bumper dock decks, traffic cones and the like.

The present invention is illustrated by the following examples.

EXAMPLE I

The following compositions were prepared:

| Composition | | % |
|---|---|---|
| A | Polypropylene | 100.0 |
| B | Polypropylene | 80.0 |
|   | Smelt | 20.0 |
| C | Polypropylene | 79.5 |
|   | Smelt | 20.0 |
|   | Irganox ™ 1010 | 0.5 |
| D | Polypropylene | 79.0 |
|   | Smelt | 20.0 |
|   | Tartaric Acid | 1.0 |
| E | Polyethylene | 100.0 |
| F | Polyethylene | 80.0 |
|   | Smelt | 20.0 |
| G | Polyethylene | 79.5 |
|   | Smelt | 20.0 |
|   | Irganox 1010 | 0.5 |
| H | Polyethylene | 79.0 |
|   | Smelt | 20.0 |
|   | Tartaric acid | 1.0 |
| I | Polyethylene | 80.0 |
|   | Calcium Carbonate SuperFlex ™ 200 | 20.0 |
| J | Polyethylene | 80.0 |
|   | Talc | 20.0 |

The polypropylene was homopolymer polypropylene obtained from Amoco under the code FO2186.

The polyethylene was low density polyethylene obtained as Dowlex under the code 25355N.

The smelt used was a Precipitator ash of the following composition:

| | % |
|---|---|
| Sodium carbonate | 74.30 |
| Sodium sulphate | 9.60 |
| Sodium sulfide | 2.90 |
| Sodium chloride | 0.08 |
| Water insolubles | 10.00 |
| Other components (oxides, silicates, magnesium and potassium salts) | 3.12 |

Samples of tensile bars were moulded on moulding apparatus using standard injection moulding procedures and temperatures appropriate to the polymer. The samples thus obtained were maintained at a constant temperature, and tensile strength and elongation measurements were performed on the samples over a period of days, using the procedures of ASTM D638.

The results obtained are given in Tables 1–4.

TABLE 1

Polypropylene/Smelt molded bars aged at 130° C.

| Composition | Tensile strength (psi) | | Elongation (%) | |
| --- | --- | --- | --- | --- |
| | Day 0 | Day 20 | Day 0 | Day 20 |
| A | 6400 | 6380 | 7.0 | 7.0 |
| B | 4900 | 5800 | 8.0 | 5.5 |
| C | 5350 | 6000 | 6.0 | 5.0 |
| D | 5600 | 5900 | 8.0 | 4.0 |

TABLE 2

Polypropylene/Smelt molded bars aged at 130° C.

| Composition | Tensile strength (psi) | | Elongation (%) | |
| --- | --- | --- | --- | --- |
| | Day 0 | Day 20 | Day 0 | Day 20 |
| E | 4000 | 1520 | 180.0 | 1.0 |
| F | 3550 | 2200 | 11.0 | 2.0 |
| G | 3700 | 4600 | 11.0 | 6.0 |
| H | 3700 | 4600 | 12.0 | 5.5 |

TABLE 3

Polypropylene/Smelt molded bars aged at 105° C. and 23° C.

| Composition | Tensile Strength (psi) | | Elongation (%) | | Temperature (° C.) |
| --- | --- | --- | --- | --- | --- |
| | Day 0 | Day 40 | Day 0 | Day 40 | |
| B | 5550 | 5460 | 6.5 | 6.4 | 105 |
| B | 5580 | 5496 | 6.6 | 6.4 | 23 |

TABLE 4

Polyethylene based Smelt, Calcium Carbonate and Talc compounds aged at 130° C.

| Composition | Tensile strength (psi) | | Elongation (%) | |
| --- | --- | --- | --- | --- |
| | Day 0 | Day 20 | Day 0 | Day 20 |
| F | 3550 | 2200 | 11.0 | 2.0 |
| I | 3800 | 2100 | 85.0 | 1.0 |
| J | 4300 | 4900 | 7.0 | 4.0 |

Table 1 shows that thermo-oxidative stability of the polypropylene/smelt compounds, both unstabilized (B) and stabilized (C,D), is high. It is comparable with the stability of the polypropylene (A) itself.

Table 2 shows the thermo-oxidative stability of the polyethylene composition. Polyethylene (E) degraded completely in 20 days at 130° C. while the smelt containing compounds did not. A stabilizer/antioxidant improves the stability(compare G and H versus F).

Table 3 shows that polypropylene/smelt composites do not degrade in forty days at 105° C. Their properties after forty days of accelerated ageing are the same as the properties of the same composites kept at room temperature.

Table 4 shows that the polyethylene/calcium carbonate composition degrades completely in 20 days at 130° C., while the polyethylene/smelt and the polyethylene/talc composites show greater thermo-oxidative stability. For the compositions F, I, J, it is to be noted that no stabilizers/antioxidants were used.

EXAMPLE II

The following formulations were prepared:

| Composition | | % |
| --- | --- | --- |
| K | Engage 8200 ethylene copolymer | 12.5 |
| | Precipitator ash | 39 |
| | Citric acid | 35.2 |
| | Oil | 13.3 |
| L | Engage 8200 ethylene copolymer | 13 |
| | Precipitator ash | 40 |
| | Citric acid | 29 |
| | Oil | 17 |
| | Stearic acid | 1 |

The precipitator ash was dried and ground for an average particle size of 5 μm and was compounded by using a pilot scale internal mixer. The obtained compounds were ground, and 2% of each of them were mixed into virgin Engage 8200 ethylene copolymer granules. The resultant compositions/mixtures were injected-molded by using a pilot scale injection-molder; porous bars were obtained as a result of the foaming action. The porous bars were a 22% (formulation K) and a 19% (formulation L) lighter compared to a bar obtained using virgin (pure) Engage 8200 ethylene copolymer. The cut surfaces of the foamed bars presented fine pores and a uniform foam distribution.

The results of tests and experiments presented in Example 1 show that different polymer-smelt compositions have good mechanical (tensile/elongation) properties, have good thermo-oxidative stability and are readily processable. The results of tests and experiments presented in Example II show that a fine smelt powder in combination with an organic acid foams the polymer during regular thermal processing and generates uniform, fine pores.

What is claimed is:

1. A composition comprising smelt and a thermoplastic polymer, said smelt having a particle size of 0.0005 mm to 1.00 mm.

2. A thermoplastic polymer containing smelt as a filler, said smelt having a particle size of 0.0005 mm to 1.00 mm.

3. A thermoplastic polymer containing smelt as a foaming agent, said smelt having a particle size of 0.0005 mm to 1.00 mm.

4. A thermoplastic polymer containing smelt as a stabilizer, said smelt having a particle size of 0.0005 mm to 1.00 mm.

5. The composition of claim 1 in which the composition of the smelt is as follows: sodium carbonate 30–99% by weight, potassium carbonate 0.01–10% by weight, sodium sulphate 0.5–30% by weight, sodium sulphide 0.01–20% by weight, sodium chloride 0–5% by weight and water insoluble chemicals, 0–40% by weight.

6. The composition of claim 1 in which the composition of the smelt is as follows: sodium carbonate 63–91% by weight, potassium carbonate 1–5% by weight, sodium sulphate 4–10% by weight, sodium sulphide 0.01–12% by weight, sodium chloride 0.09–2% by weight and water insoluble chemicals 3.9–8% by weight.

7. The composition of claim 1 in which the composition of the smelt is as follows: sodium carbonate 41–99% by weight, potassium carbonate 0.01–3% by weight, sodium sulphate 0.98–20% by weight, sodium sulphide 0.01–14% by weight, sodium chloride 0–2% by weight and water insoluble chemicals 0–20% by weight.

8. A composition of claim 1 in which the smelt has a particle size of 0.001 to 0.010 mm.

9. A composition comprising thermoplastic polymer and up to 90% by weight of smelt, said smelt having a particle size of 0.0005 mm to 1.00 mm.

10. The composition of claim 8 in which there is up to 80% of smelt.

11. The composition of claim 1 in which the thermoplastic polymer is a polyolefin.

12. The composition of claim 1 in which the thermoplastic polymer is polyethylene, polypropylene or copolymers of ethylene and propylene.

13. The composition of claim 1 in which the thermoplastic polymer is ethylene/vinyl acetate copolymer or ethylene/acrylic acid copolymer.

14. The composition of claim 1 in which the thermoplastic polymer is ethylene/propylene copolymer rubbers or ethylene/propylene/diene copolymer elastomers.

15. The composition of claim 1 in which the polymer is an acrylonitrile/butadiene/styrene polymer.

16. A composition of claim 1 in which the composition further contains an organic acid, plastifier, stabiliser, additional filler, pigment and/or colorant.

17. The composition of claim 1 in which the composition contains up to 50% by weight of mono- or poly-functional organic acid.

18. The composition of claim 1 in which the composition contains up to 36% by weight of a mono- or polyfunctional organic acid.

19. The composition of claim 18 in which the acid is selected from oxalic acid, tartaric acid, citric acid, malic acid, maleic acid, malonic acid and succinic acid.

20. The composition of claim 1, wherein the thermoplastic polymer is chosen from the group consisting of: polyolefins, polyamides, polyurethanes, polyesters, polycarbonates, polymers of acyrlic compounds, elastomers of acrylic compounds, polymers of vinyl compounds, polymers of olefins and vinyl compounds, polymers of olefins and acrylic compounds, and elastomers of olefins.

* * * * *